(12) United States Patent
Oota et al.

(10) Patent No.: US 11,565,331 B2
(45) Date of Patent: Jan. 31, 2023

(54) NUMERICAL CONTROLLER

(71) Applicant: Fanuc Corporation, Yamanashi (JP)

(72) Inventors: Yuu Oota, Yamanashi (JP); Masaru Kuroiwa, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 542 days.

(21) Appl. No.: 16/660,292

(22) Filed: Oct. 22, 2019

(65) Prior Publication Data

US 2020/0147700 A1    May 14, 2020

(30) Foreign Application Priority Data

Nov. 14, 2018 (JP) .............................. JP2018-214203

(51) Int. Cl.
*B23B 49/00* (2006.01)
*G05B 19/18* (2006.01)

(52) U.S. Cl.
CPC ............ *B23B 49/00* (2013.01); *G05B 19/182* (2013.01); *B23B 2270/32* (2013.01); *G05B 2219/49108* (2013.01); *G05B 2219/49397* (2013.01)

(58) Field of Classification Search
CPC ... B23B 49/00; B23B 2270/32; G05B 19/182; G05B 2219/49108; G05B 2219/49397; G05B 19/4155; G05B 2219/32026
See application file for complete search history.

(56) References Cited

U.S. PATENT DOCUMENTS 3,614,575 A * 10/1971 Cutler .................. G05B 19/182
                                                318/569
5,815,400 A *  9/1998 Hirai .................... G05B 19/401
                                                700/184

FOREIGN PATENT DOCUMENTS

| JP | 59201107 A | | 11/1984 | |
| JP | 60134909 A | * | 7/1985 | ........... G05B 19/182 |
| JP | 60134909 A | | 7/1985 | |
| JP | S60201811 A | * | 10/1985 | ......... B23Q 17/0947 |
| JP | 05177504 A | | 7/1993 | |
| JP | H05177504 A | * | 7/1993 | ............. B23Q 15/00 |
| JP | 08229773 A | | 9/1996 | |
| JP | 2733665 B2 | * | 3/1998 | ......... G05B 19/4093 |
| JP | 2015187799 A | * | 10/2015 | ......... G05B 19/4155 |
| JP | 2015187799 A | | 10/2015 | |
| JP | 6316997 B1 | * | 4/2018 | |
| WO | WO-2012133222 A1 | * | 10/2012 | ............. G05B 19/18 |

OTHER PUBLICATIONS

Japanese Decision to Grant a Patent for Japanese Application No. 2018-214203, dated Mar. 16, 2021, with translation, 5 pages.

* cited by examiner

*Primary Examiner* — Thomas C Lee
*Assistant Examiner* — Michael Tang
(74) *Attorney, Agent, or Firm* — RatnerPrestia

(57) ABSTRACT

A drilling machine performs a feed operation while rotating a spindle, suspends the feed operation of the spindle for a predetermined dwell time at a predetermined hole bottom position, and then performs drilling by retreating the spindle. A controller for controlling the drilling machine calculates the dwell time based on a prescribed rotation amount in response to specification of the prescribed rotation amount (dwell rotation amount) at the hole bottom position.

3 Claims, 6 Drawing Sheets

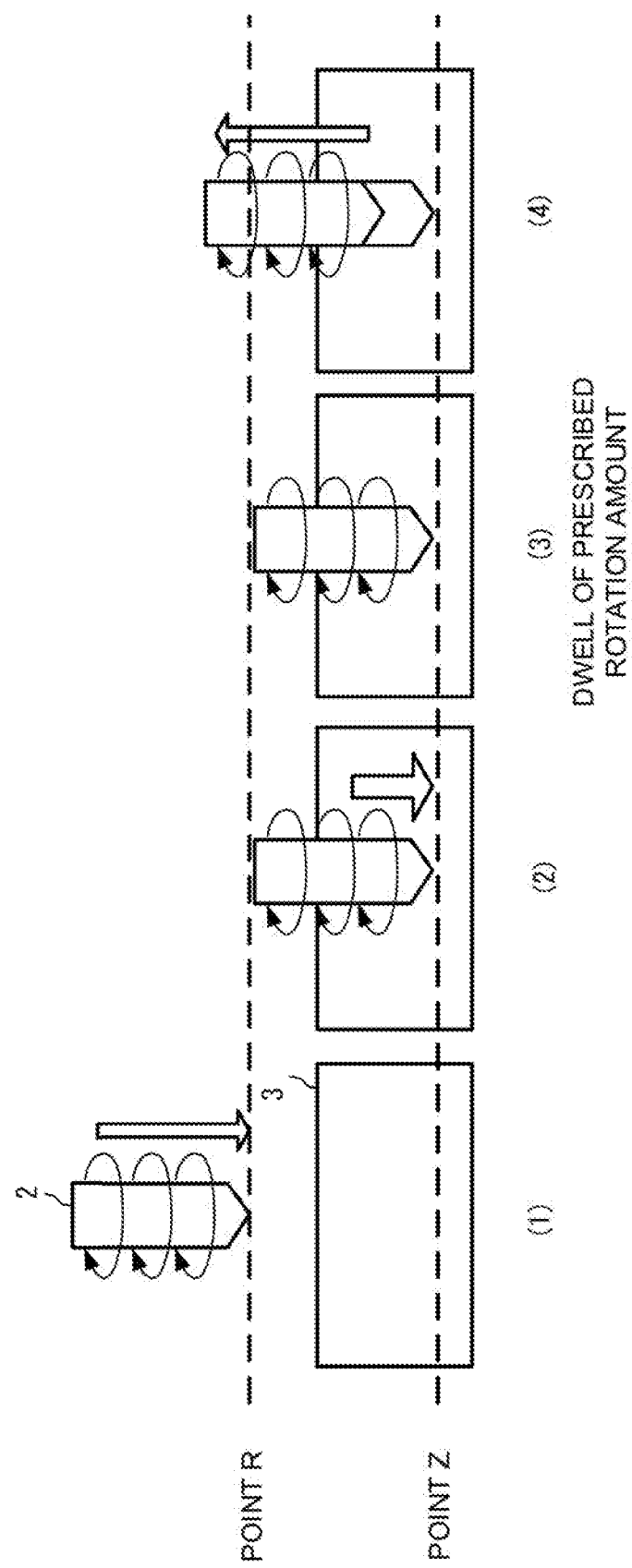

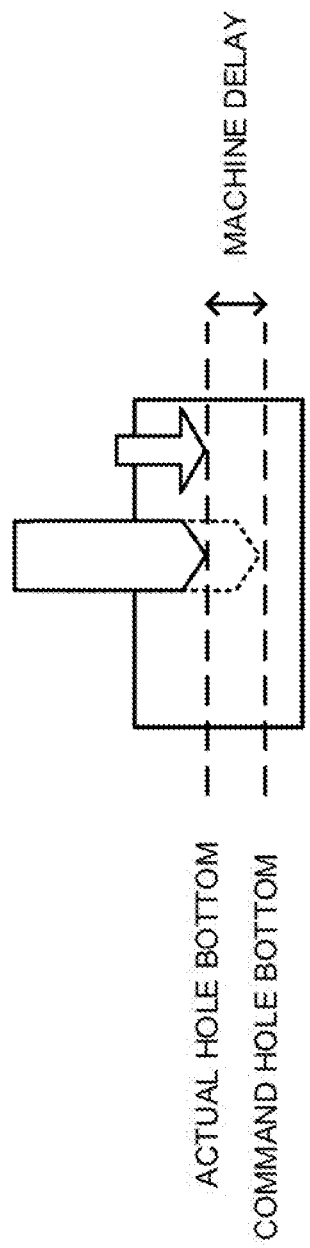

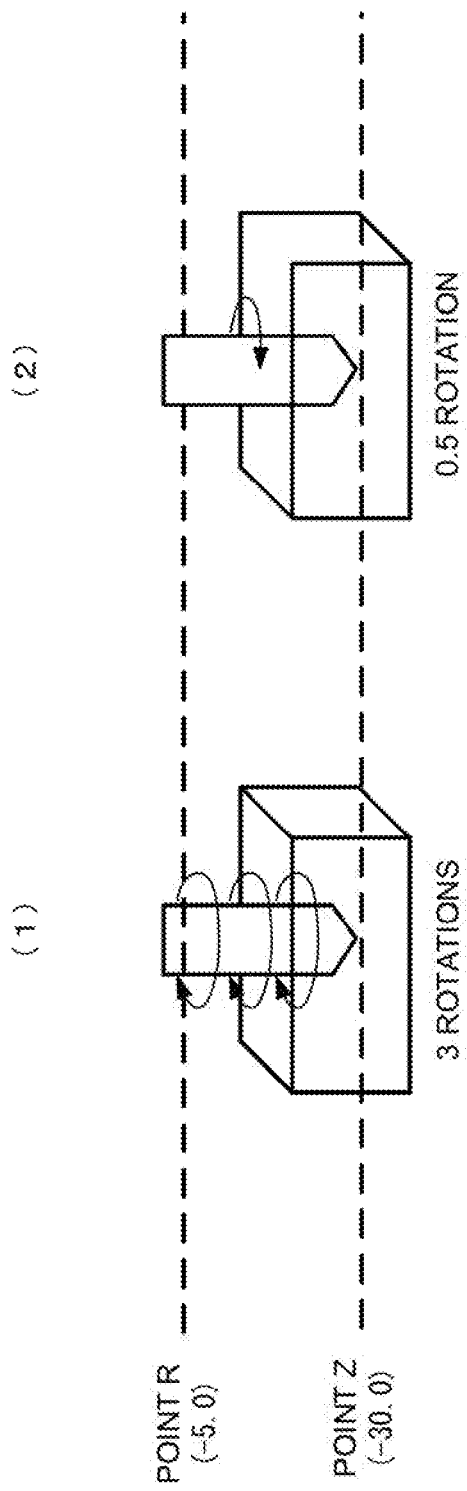

NUMERICAL CONTROLLER

RELATED APPLICATIONS

The present application claims priority to Japanese Patent Application Number 2018-214203 filed Nov. 14, 2018, the disclosure of which is hereby incorporated by reference herein in its entirety.

BACKGROUND OF THE INVENTION

1. Field of the Invention

The application relates to a numerical controller, and particularly relates to a numerical controller that optimizes hole bottom dwell.

2. Description of the Related Art

FIG. 1 is a diagram describing a machining method referred to as dwell.

In drilling, as illustrated in FIG. 1, a tool 2 is moved toward a workpiece 3 by rapid traverse up to a point R and cutting feed is started at the point R (1). In response to a distal end of the tool 2 arriving at a hole bottom (point Z) (2), the cutting feed is suspended for a specified time while maintaining rotation of a spindle (not illustrated) to improve machining accuracy at the hole bottom (not to leave an uncut part) (3). Thereafter, the tool 2 is retracted (4). A suspension time in item (3) is referred to as a dwell time.

When the dwell time at the hole bottom is insufficient, the machining accuracy at the hole bottom deteriorates. Specifically, an uncut part, an insufficient hole depth, etc. is generated. For example, when the tool 2 has two blades, an uncut part may be generated unless the blades are rotated by ½ turn or more. When the tool 2 has three blades, an uncut part may be generated unless the blades are rotated by ⅓ turn or more. Meanwhile, when the dwell time at the hole bottom is excessive, a cycle time becomes longer.

Conventionally, when commanding a dwell time, an operator may obtain a time T per rotation of a spindle based on the spindle speed, and command the dwell time at the hole bottom, the dwell time being obtained by multiplying prescribed rotation amount by time T. However, since the dwell time varies depending on the spindle speed, this method requires a time and effort for machining programming. Therefore, a uniform dwell time may be commanded. However, it is difficult to minimize the cycle time.

In addition, in actual machining, due to an influence of delay of a machine position (hereinafter referred to as machine delay) with respect to a command value, a dwell time may be started before the tool arrives at the hole bottom. As a result, the dwell time at the hole bottom is less than the commanded dwell time, and an uncut part, an insufficient hole depth, etc. may be generated. For this reason, it is necessary to determine an appropriate value of the dwell time to be commanded by trial and error, which is troublesome.

Japanese Patent Application Laid-Open No. 2004-1120 and Japanese Patent Application Laid-Open No. 2015-5108 have been known as a conventional technology related to drilling. Both of these documents describe that in drilling, when the tool arrives at a hole bottom position, the spindle is decelerated and stopped, and a direction of movement is reversed to retract the tool.

However, neither Japanese Patent Application Laid-Open No. 2004-1120 nor Japanese Patent Application Laid-Open No. 2015-5108 provides means for solving a problem that it is difficult to command an optimal dwell time.

SUMMARY OF THE INVENTION

In response to the above issue, it is an object of the present invention to provide a numerical controller that optimizes hole bottom dwell.

A numerical controller according to the application is a numerical controller of a drilling machine for performing a feed operation while rotating a spindle, suspending the feed operation of the spindle for a predetermined dwell time at a predetermined hole bottom position, and then performing drilling by retreating the spindle, and the numerical controller includes a dwell computation unit for calculating the dwell time based on a prescribed rotation amount in response to specification of the prescribed rotation amount at the hole bottom position.

The dwell computation unit may add a time corresponding to a delay at a tool position with respect to a command to the dwell time.

The prescribed rotation amount may be specified by a program command or a parameter.

The present invention can provide a numerical controller that optimizes hole bottom dwell with the above-described configurations.

BRIEF DESCRIPTION OF THE DRAWINGS

FIG. 4 is an example of diagram illustrating an operation of the numerical controller;

FIG. 5 is an example of diagram illustrating an operation of the numerical controller; and FIG. 6 is a diagram illustrating an operational example of the numerical controller.

DETAILED DESCRIPTION OF THE PREFERRED EMBODIMENTS

Figure 1:
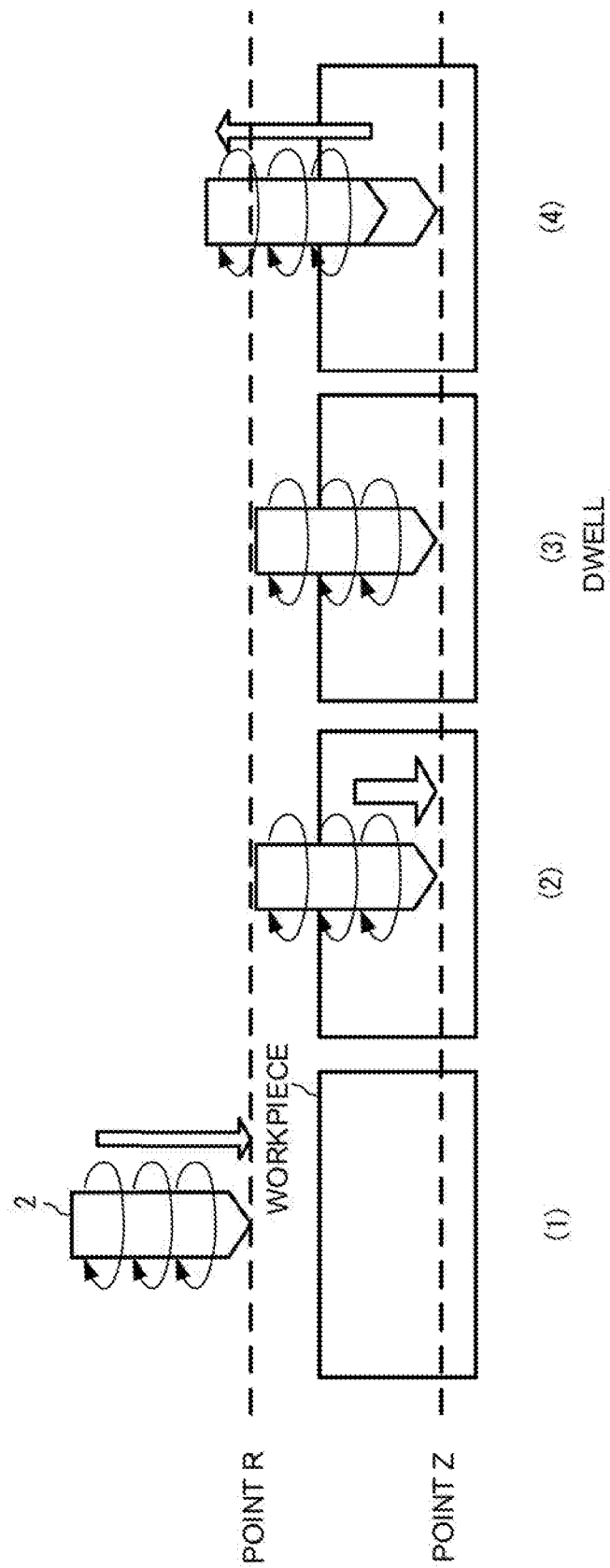
FIG. 1 is a diagram describing conventional drilling.
Figure 2:
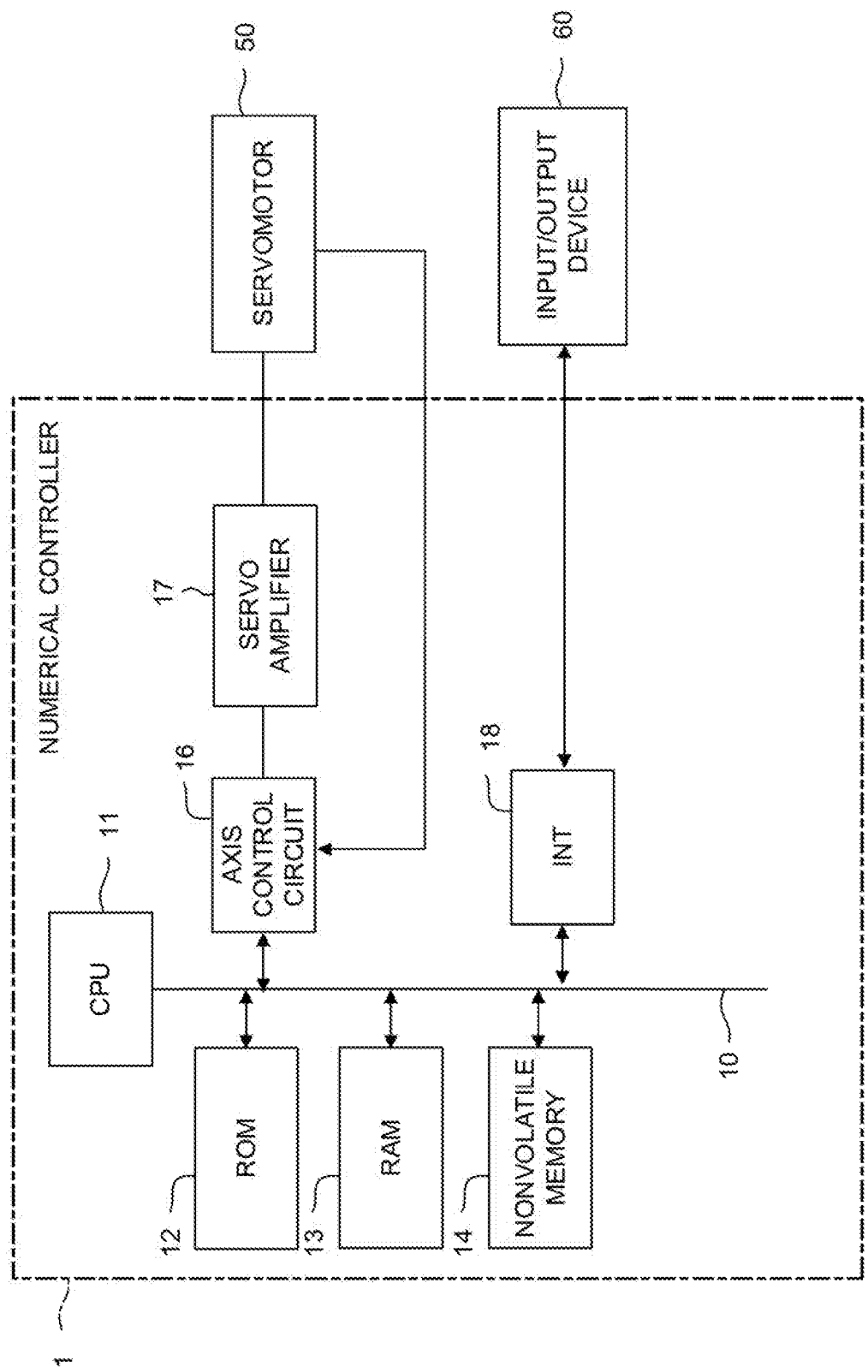
FIG. 2 is a diagram illustrating a hardware configuration example of a numerical controller.

FIG. 2 is a schematic hardware configuration diagram illustrating a main part of a numerical controller 1 according to an embodiment of the application.

The numerical controller 1 is a device that controls an industrial machine performing drilling. The numerical controller 1 includes a central processing unit (CPU) 11, a read only memory (ROM) 12, a random access memory (RAM) 13, a nonvolatile memory 14, a bus 10, an axis control circuit 16, a servo amplifier 17, and an interface 18. A servomotor 50 and an input/output device 60 are connected to the numerical controller 1.

The CPU 11 is a processor that controls the numerical controller 1 as a whole. The CPU 11 reads a system program stored in the ROM 12 via the bus 10 and controls the entire numerical controller 1 according to the system program.

For example, the ROM 12 stores a system program for executing various controls on a machine in advance. The RAM 13 temporarily stores temporary calculation data or display data, data and a program input by an operator via the input/output device 60, etc.

The nonvolatile memory 14 is backed up by a battery (not illustrated), for example, and retains a storage state even when power supply of the numerical controller 1 is shut off.

The nonvolatile memory 14 stores data and a program input from the input/output device 60. The program and data stored in the nonvolatile memory 14 may be loaded in the RAM 13 at the time of execution and use.

The axis control circuit 16 controls motion axes of the machine. The axis control circuit 16 receives an axis movement command amount output by the CPU 11 and outputs a movement command of the motion axis to the servo amplifier 17. The servo amplifier 17 receives the axis movement command output by the axis control circuit 16 and drives the servomotor 50.

The servomotor 50 is driven by the servo amplifier 17 to move the motion axes of the machine. In the present embodiment, spindle movement is performed by the servomotor 50. The servomotor 50 typically incorporates a position/velocity detector. The position/velocity detector outputs a position/velocity feedback signal, and this signal is fed back to the axis control circuit 16 to perform position/velocity feedback control.

In FIG. 2, only one axis control circuit 16, one servo amplifier 17, and one servomotor 50 are illustrated. However, in practice, the servo amplifiers, the servomotors and the axis control circuit of which numbers correspond to the number of axes included in the machine to be controlled, respectively, are prepared.

The input/output device 60 is a data input/output device including a display, a hardware key, etc., and is typically a manual data input device (MDI) or an operator's panel. The input/output device 60 displays information received from the CPU 11 via the interface 18 on a display. The input/output device 60 passes a command, data, etc. input from the hardware key, etc. to the CPU 11 via the interface 18.

Figure 3:
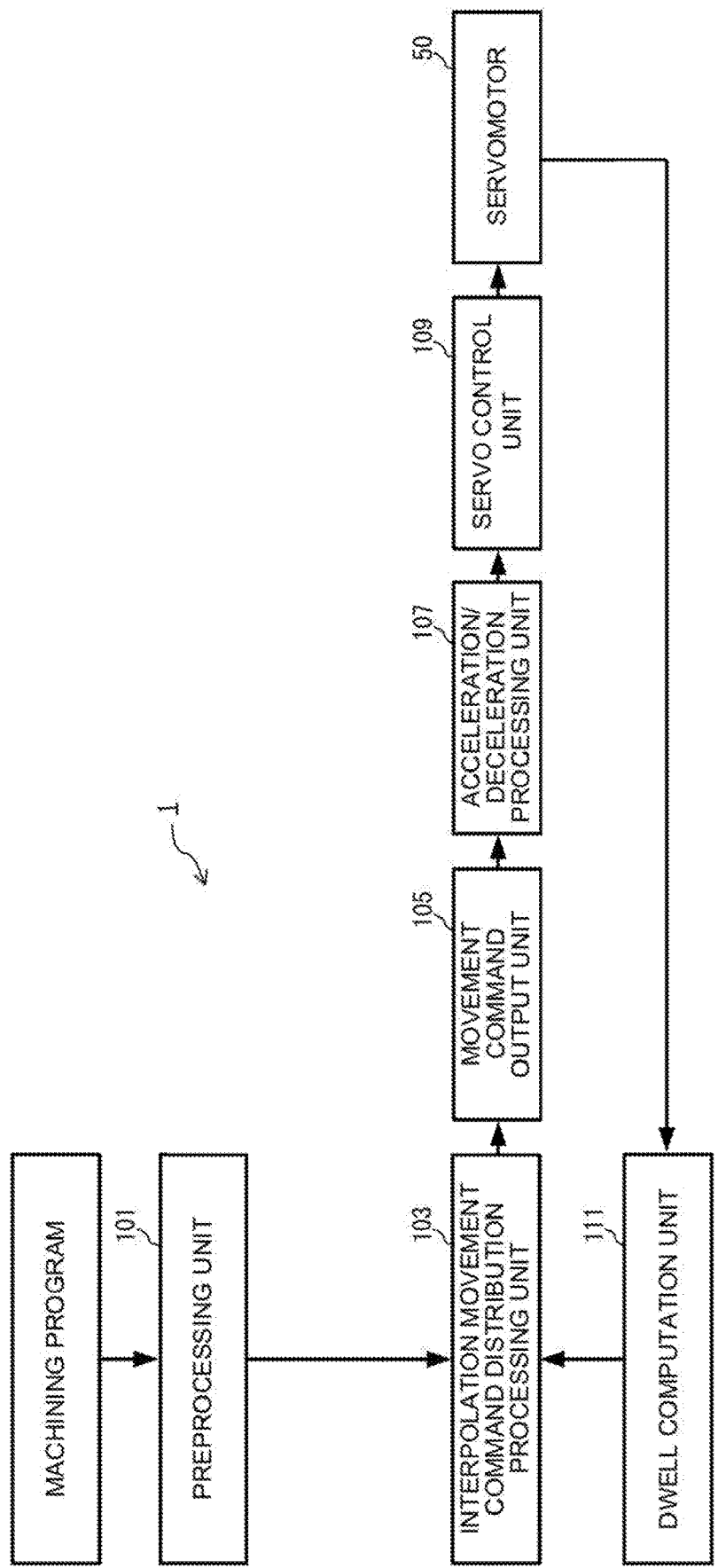
FIG. 3 is a diagram illustrating an example of functional configuration of the numerical controller.

FIG. 3 is a block diagram illustrating a characteristic functional configuration of the numerical controller 1.

The numerical controller 1 includes a preprocessing unit 101 that reads and analyzes a machining program, an interpolation movement command distribution processing unit 103 that generates an interpolation movement command and distributes the generated interpolation movement command to each axis, a movement command output unit 105 that outputs a movement command to each axis, an acceleration/deceleration processing unit 107 that performs acceleration/deceleration after interpolation, and a servo control unit 109 that controls the servomotor 50. Further, the numerical controller 1 includes a dwell computation unit 111 that computes an appropriate dwell time as a component unique to the application.

A characteristic operation of the numerical controller 1 will be described with reference to FIG. 4.

In a conventional numerical controller, it is necessary to specify a dwell time in the machining program. However, the numerical controller 1 according to the present embodiment can specify a dwell rotation amount (hereinafter also referred to as a prescribed rotation amount) in the machining program. In this case, the preprocessing unit 101 acquires the prescribed rotation amount. Alternatively, the numerical controller 1 may hold an arbitrary prescribed rotation amount as a parameter.

The interpolation movement command distribution processing unit 103, the movement command output unit 105, the acceleration/deceleration processing unit 107, and the servo control unit 109 move the tool toward the workpiece 3 by rapid traverse up to a point R and start cutting feed at the point R according to the machining program analyzed by the preprocessing unit 101 (2). Then, in response to a distal end of the tool arriving at a hole bottom (point Z), dwell is started (2). However, as illustrated in FIG. 5, a position at which dwell is started (actual hole bottom) is ahead of a commanded hole bottom position (command hole bottom) due to machine delay. When the tool enters an in-position range of the actual hole bottom, the dwell computation unit 111 calculates the dwell time in the following manner.

The dwell computation unit 111 computes the dwell time such that the rotation amount of the spindle becomes a prescribed number. Specifically, a time per rotation of the spindle is obtained from a rotation velocity of the spindle, and time×prescribed rotation amount is defined as the dwell time. The rotation velocity of the spindle can be specified from a spindle rotation command. In addition, the dwell computation unit 111 adds a time required for the tool to arrive at the command hole bottom from the actual hole bottom, that is, a machine delay time, to the dwell time. In other words, in this example, execution of a subsequent movement command is waited for by the delay time.

After executing the dwell according to the dwell time computed as described above, the process proceeds to the subsequent movement command (3), and the tool is retracted (4). Accordingly, since the dwell of the prescribed rotation amount is executed after the tool arrives at the command hole bottom, it is possible to perform drilling with a shortest cycle time while maintaining machining accuracy.

An example of the application will be described with reference to FIG. 6.

In this example, a command according to the following command format can be used in the machining program. In this command format, a dwell rotation amount (prescribed rotation amount) can be specified unlike the conventional case.

Command format example:

G82 Z_R_F_P_

Z: Hole bottom

R: Reference point

F: Cutting feed rate

P: Dwell rotation amount (prescribed rotation amount)

Command example: In case of absolute command and per-minute feed (1) G82 Z−30.0 R−5.0 F100.0 P3.0

(2) G82 Z−30.0 R−5.0 F100.0 P0.5

The prescribed rotation amount can be uniformly set as a parameter. However, since a different value may be used as the prescribed rotation amount depending on the material of the workpiece, etc., it is preferable that the prescribed rotation amount can be specified in the machining program as described above. When the prescribed rotation amount is specified in the machining program, the prescribed rotation amount can be used in preference to the parameter.

In a case of a command example (1), the numerical controller 1 starts cutting feed at a point R (−5.0), and executes the dwell of the prescribed rotation amount (3 rotations) at a point Z (−30.0). In a case of a command example (2), the dwell of a prescribed rotation amount (0.5 rotation) is executed in the same manner.

More specifically, a commanded prescribed rotation amount P is internally converted into a dwell time by the dwell computation unit 111. In addition, even though the dwell is started at the actual hole bottom (not illustrated) before the point Z (−30.0), since a time until arriving at the point Z (−30.0) corresponding to the command hole bottom (mechanical delay time) is added to the dwell time, the dwell of the prescribed rotation amount at the command hole bottom is guaranteed. That is, a time obtained by adding a dwell time corresponding to the prescribed rotation amount P to a mechanical delay time corresponds to an actual dwell time.

According to the present embodiment, the dwell computation unit 111 adjusts the dwell time so that the dwell of the prescribed rotation amount is executed after the tool arrives at the command hole bottom. In this way, drilling can be performed in a shortest cycle time while maintaining the machining accuracy. That is, the dwell time shortage at the hole bottom is eliminated, and the machining accuracy at the hole bottom is improved. In addition, an excess dwell time at the hole bottom is eliminated, and the cycle time can be minimized.

The invention claimed is:

1. A numerical controller of a drilling machine, the numerical controller comprising:
a processor configured to:
calculate a dwell time for a tool of the drilling machine to drill a hole at a predetermined hole bottom position within a workpiece, the dwell time calculated based on a prescribed rotation amount of the tool required to drill the hole at the bottom position of the workpiece while eliminating uncut portions within the hole at the bottom position of the workpiece;
perform a feed operation to move the tool in a direction of the workpiece while rotating a spindle rotate the tool to drill the workpiece; and
suspend the feed operation of the spindle for the dwell time when the tool is at the predetermined hole bottom position within the workpiece while the spindle continues to rotate the tool to drill the workpiece, and then after the dwell time has elapsed, retract the tool in a direction away from the workpiece,
wherein the prescribed rotation amount is set based on the number of blades of the tool to ensure that the uncut portions within the hole at the bottom position of the workpiece are eliminated.

2. The numerical controller according to claim 1, wherein the processor is further configured to add a time corresponding to a delay at a tool position with respect to a command to the dwell time.

3. The numerical controller according to claim 1, wherein the prescribed rotation amount is specified by a program command or a parameter.

* * * * *